United States Patent
Shimadate

(10) Patent No.: US 9,600,148 B2
(45) Date of Patent: Mar. 21, 2017

(54) IMAGE DISPLAY APPARATUS, IMAGE DISPLAY METHOD, AND COMPUTER-READABLE MEDIUM

(71) Applicant: FUJI XEROX CO., LTD, Minato-ku, Tokyo (JP)

(72) Inventor: Kiyoko Shimadate, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 197 days.

(21) Appl. No.: 14/209,479

(22) Filed: Mar. 13, 2014

(65) Prior Publication Data
US 2015/0046866 A1 Feb. 12, 2015

(30) Foreign Application Priority Data

Aug. 6, 2013 (JP) .................................. 2013-163652

(51) Int. Cl.
```
G06F 3/048      (2013.01)
G06F 3/0483     (2013.01)
G06F 3/0485     (2013.01)
G06F 3/0488     (2013.01)
G06F 3/0484     (2013.01)
```
(52) U.S. Cl.
CPC .......... *G06F 3/0483* (2013.01); *G06F 3/0485* (2013.01); *G06F 3/0488* (2013.01); *G06F 3/04842* (2013.01); *G06F 3/04883* (2013.01)

(58) Field of Classification Search
CPC .................... G06F 3/0485; G06F 3/04883
See application file for complete search history.

(56) References Cited

U.S. PATENT DOCUMENTS

| | | | |
|---|---|---|---|
| 2007/0013708 A1* | 1/2007 | Barcklay | G06F 17/30902 345/557 |
| 2008/0165210 A1 | 7/2008 | Platzer et al. | |
| 2011/0025627 A1 | 2/2011 | Sakai | |
| 2011/0225492 A1 | 9/2011 | Boettcher et al. | |
| 2012/0249487 A1 | 10/2012 | Cai et al. | |
| 2013/0033525 A1* | 2/2013 | Markiewicz | G06F 3/0485 345/684 |
| 2013/0176256 A1* | 7/2013 | Hara | G06F 3/0485 345/173 |

FOREIGN PATENT DOCUMENTS

| | | |
|---|---|---|
| JP | 2007-293511 A | 11/2007 |
| JP | 2010-113459 A | 5/2010 |

OTHER PUBLICATIONS

Communication dated Aug. 13, 2015 from the Australian Patent Office issued in corresponding Australian application No. 2014201684.

\* cited by examiner

*Primary Examiner* — Jeffrey A Gaffin
*Assistant Examiner* — Justin Lee
(74) *Attorney, Agent, or Firm* — Sughrue Mion, PLLC

(57) ABSTRACT

An image display apparatus includes a detection unit and a controller. The detection unit detects a specified position on a display screen on which an image is displayed. When the specified position on the display screen is moved, the controller performs a page switching operation or a move operation on the basis of a movement direction in which the specified position is moved. The page switching operation is an operation of switching an image being displayed on the display screen to another image. The move operation is an operation of moving a display position of the image being displayed on the display screen.

8 Claims, 18 Drawing Sheets

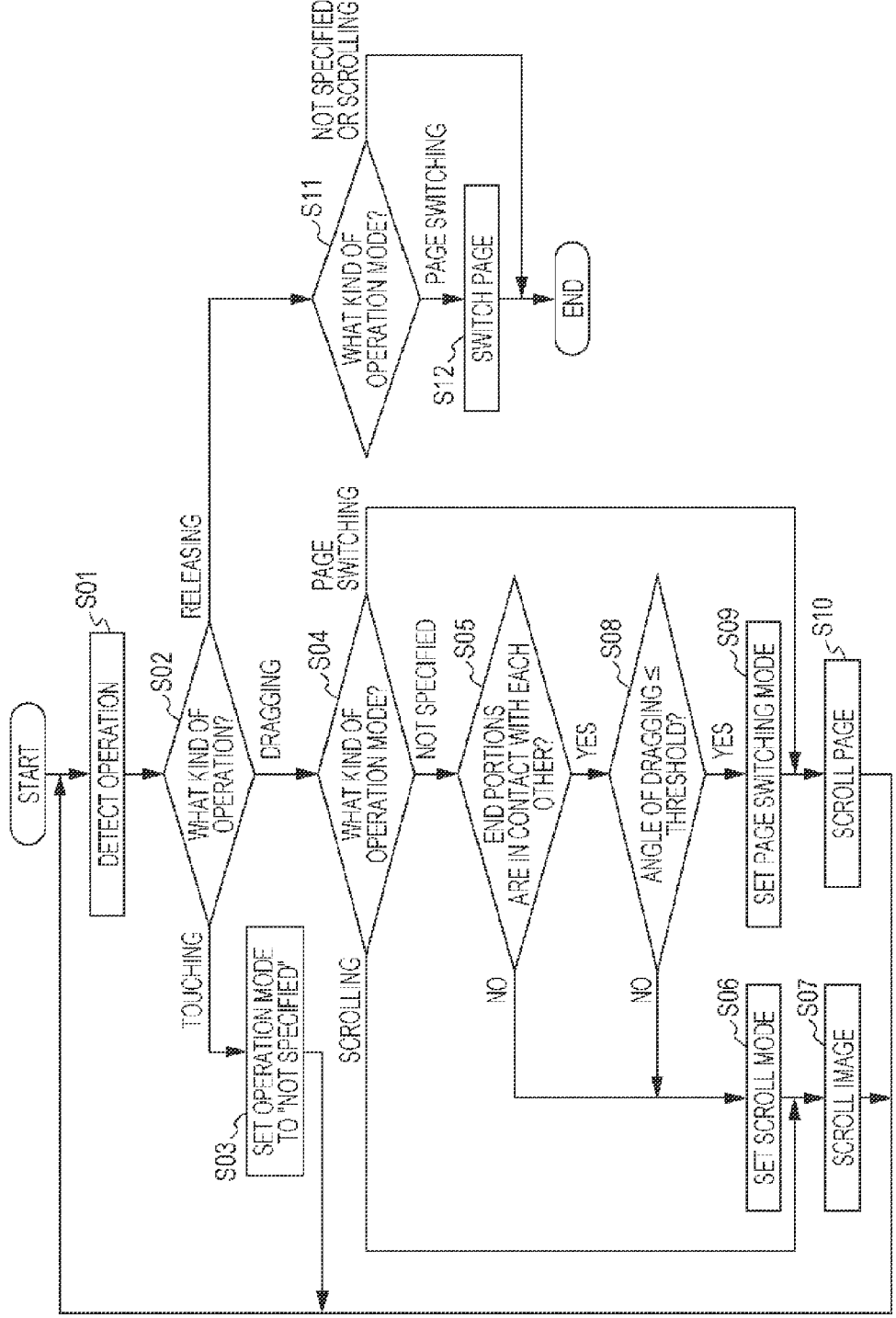

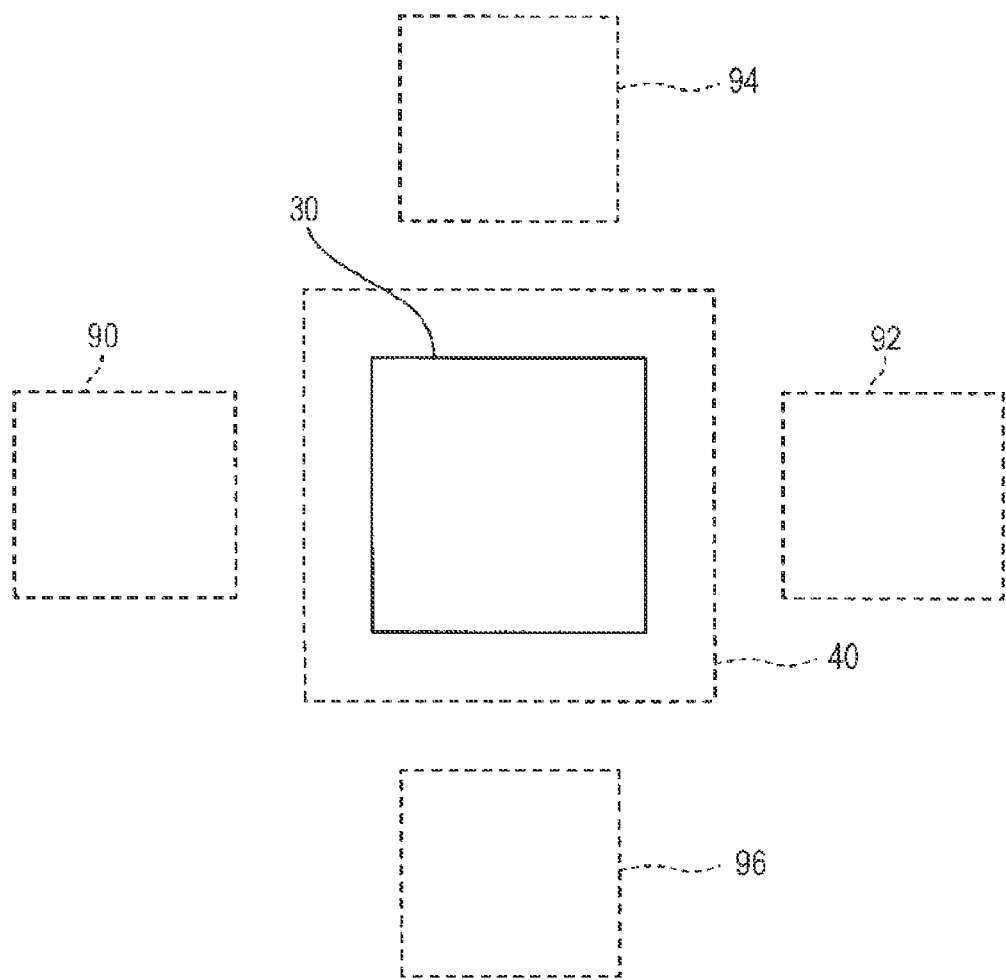

IMAGE DISPLAY APPARATUS, IMAGE DISPLAY METHOD, AND COMPUTER-READABLE MEDIUM

CROSS-REFERENCE TO RELATED APPLICATIONS

This application is based on and claims priority under 35 USC 119 from Japanese Patent Application No. 2013-163652 filed Aug. 6, 2013.

BACKGROUND (i) Technical Field

The present invention relates to an image display apparatus, an image display method, and a computer-readable medium.

(ii) Related Art

When an image is displayed on a display screen of an image display apparatus having a touch panel, various control operations are performed in such a manner as to be linked to dragging operations (operations of moving a finger of a user, a pointing device, or the like while the user is pressing the touch panel with the finger, the pointing device, or the like). For example, when an image displayed on the display screen is to be switched to another image, or when the display position of an enlarged image is to be moved, a dragging operation is performed.

SUMMARY

According to an aspect of the present invention, there is provided an image display apparatus including a detection unit and a controller. The detection unit detects a specified position on a display screen on which an image is displayed. When the specified position on the display screen is moved, the controller performs a page switching operation or a move operation on the basis of a movement direction in which the specified position is moved. The page switching operation is an operation of switching an image being displayed on the display screen to another image. The move operation is an operation of moving a display position of the image being displayed on the display screen.

BRIEF DESCRIPTION OF THE DRAWINGS

Exemplary embodiment of the present invention will be described in detail based on the following figures, wherein:

FIG. 10 is a flowchart of an exemplary operation of an image display apparatus according to the exemplary embodiment;

FIG. 13 is a schematic diagram for describing a process according to a first modified embodiment;

DETAILED DESCRIPTION

Figure 1:
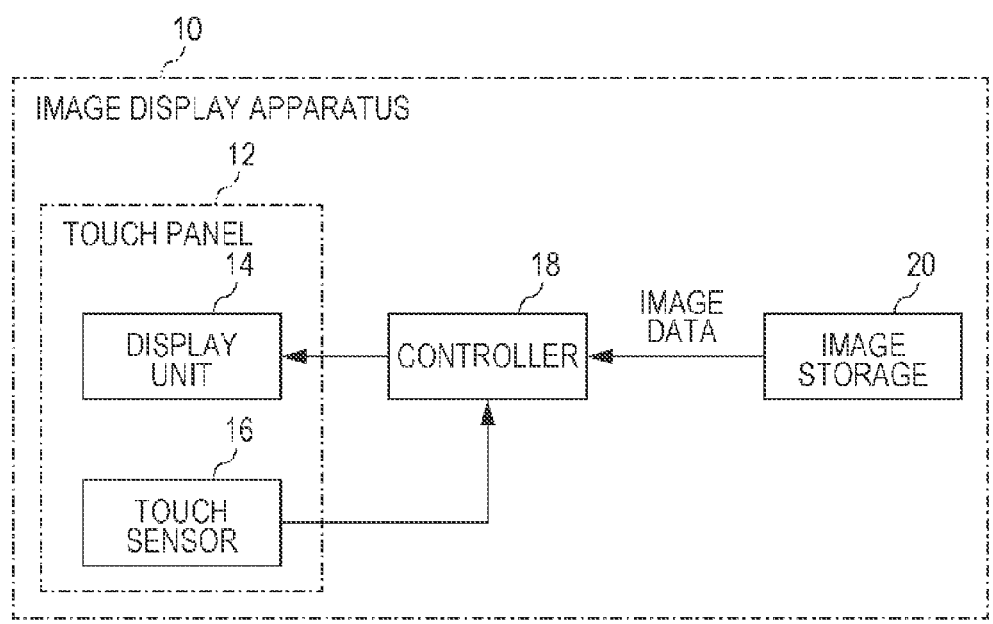
FIG. 1 is a block diagram illustrating an exemplary image display apparatus according to an exemplary embodiment.

FIG. 1 illustrates an image display apparatus according to an exemplary embodiment of the present invention. An image display apparatus 10 according to the present exemplary embodiment includes a touch panel 12 serving as a display operation unit, a controller 18, and an image storage 20.

The image display apparatus 10 is provided for, for example, an image forming apparatus. The image forming apparatus is provided with at least one of, for example, a scanning function of reading out a document to generate image data, a copy function of reading out a document to form an image based on the document on paper, and a print function of receiving image data to form an image based on the image data on paper. The image display apparatus 10 may be provided for an apparatus other than an image forming apparatus, such as a portable terminal or a personal computer. Thus, the present exemplary embodiment may be applied to any apparatus as long as the apparatus uses a touch panel.

The touch panel 12 includes a display unit 14 such as a liquid crystal panel, and also includes a touch sensor 16 disposed on a display screen of the display unit 14. The touch panel 12 displays an image, and receives a user operation by detecting a touch applied by a user on the display screen of the display unit 14 by using the touch sensor 16. For example, the touch sensor 16 detects a position at which a user presses the display screen of the display unit 14, and outputs position information of the pressing to the controller 18.

The controller 18 displays an image based on image data stored in the image storage 20 on the display unit 14. The controller 18 also receives position information from the touch sensor 16, and controls the display unit 14 on the basis of the position information.

The image storage 20 stores, for example, image data constituted by multiple pages (e.g., document data). When the image display apparatus 10 is provided for an image forming apparatus, the image storage 20 stores image data generated through the scanning function, image data which is to be subjected to the print function, and the like. For example, an image based on image data generated through the scanning function or an image based on image data which is to be subjected to the print function is displayed on the display unit 14.

Figure 2:
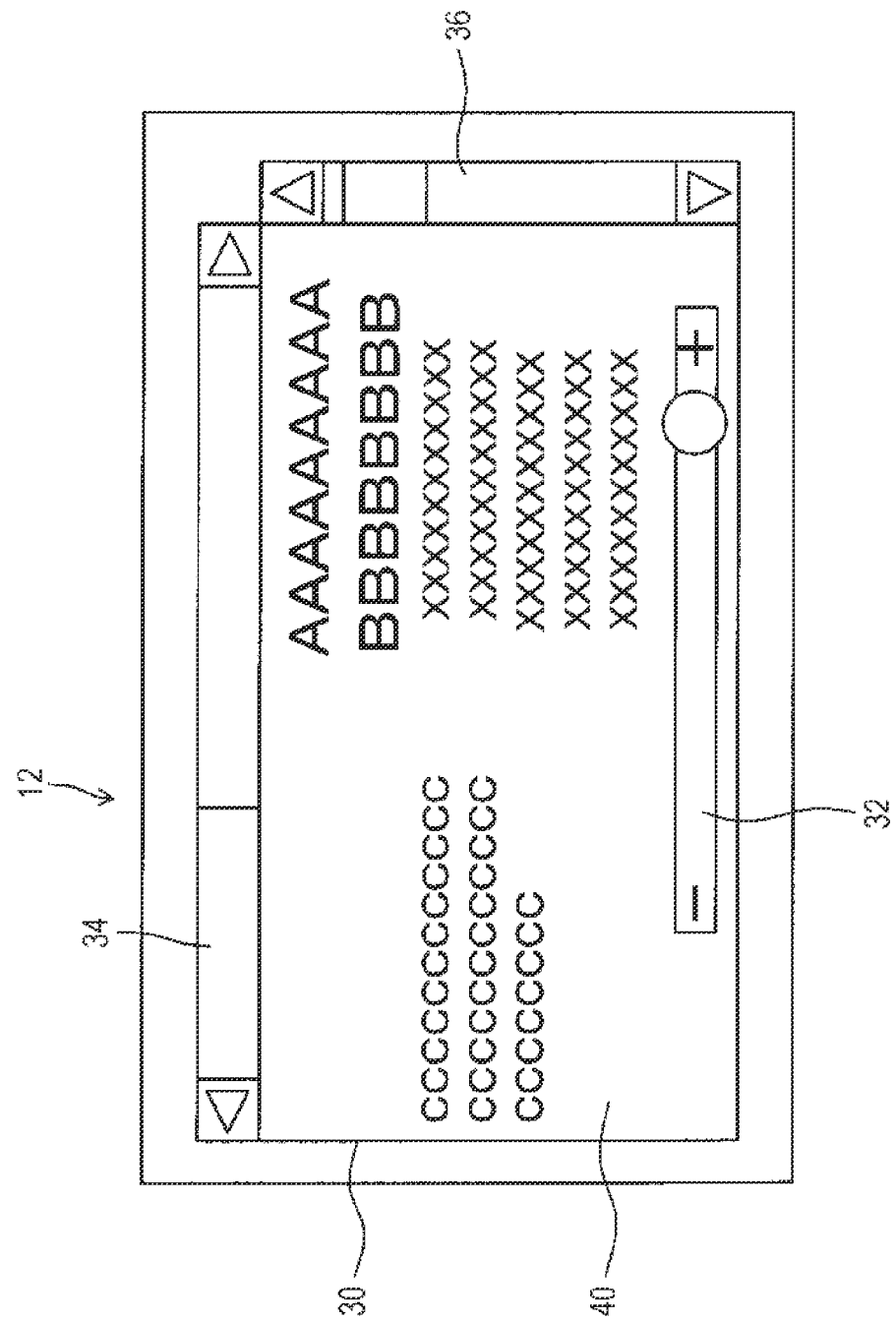
FIG. 2 is a schematic diagram illustrating an exemplary display of a touch panel.

FIG. 2 illustrates an exemplary display of the touch panel 12. On the touch panel 12, a display area 30 on which an image is displayed, a display magnification slider 32 for specifying a display magnification (enlargement or reduction) of the image, a horizontal scroll bar 34 for moving the display position of the image in the horizontal direction, and a vertical scroll bar 36 for moving the display position of the image in the vertical direction are displayed. The controller 18 enlarges or reduces a display page image 40 which is an image to be displayed, according to a display magnification specified by the display magnification slider 32 so as to display it on the display unit 14.

A user operation for the touch panel 12 will be described. Examples of a user operation for the touch panel 12 include a touch operation, a dragging operation, and a releasing operation. When the display screen of the display unit 14 is touched with a user's finger or a pointing device, the touch sensor 16 detects a "touch operation". When the touch position on the display screen is moved, the touch sensor 16 detects a "dragging operation". When a user's finger or a pointing device is released from the display screen, the touch sensor 16 detects a "releasing operation".

The position information which is output from the touch sensor 16 may include information about the movement direction (drag direction) in which the touch position was moved in the dragging operation and information about a distance (drag distance) by which the touch position was moved, or may include only coordinates information of the position at which the pressing was performed. When the position information includes only coordinates information, the controller 18 obtains the drag direction and the length of the dragging on the basis of the coordinates information.

In the present exemplary embodiment, the scroll mode and the page switching mode are used as an operation mode for an image displayed on the display screen. In the scroll mode, the controller 18 detects the drag direction and the drag distance in a dragging operation, and moves the display position of an enlarged image displayed on the display area 30 in accordance with the drag direction and the drag distance. In the page switching mode, the controller 18 switches an image in the page displayed on the display area 30 to an image of another page in accordance with the dragging operation.

The controller 18 determines an operation mode from the scroll mode and the page switching mode on the basis of the drag direction of a dragging operation. Specifically, in a state in which an end portion of the display page image 40 is in contact with an end portion of the display area 30, when a dragging operation is performed, the controller 18 determines an operation mode in accordance with the drag direction.

The control operation performed by the controller 18 will be described in detail below. For example, when image data constituted by multiple pages is displayed on the touch panel 12, an image to be displayed is enlarged and displayed.

Figure 3:
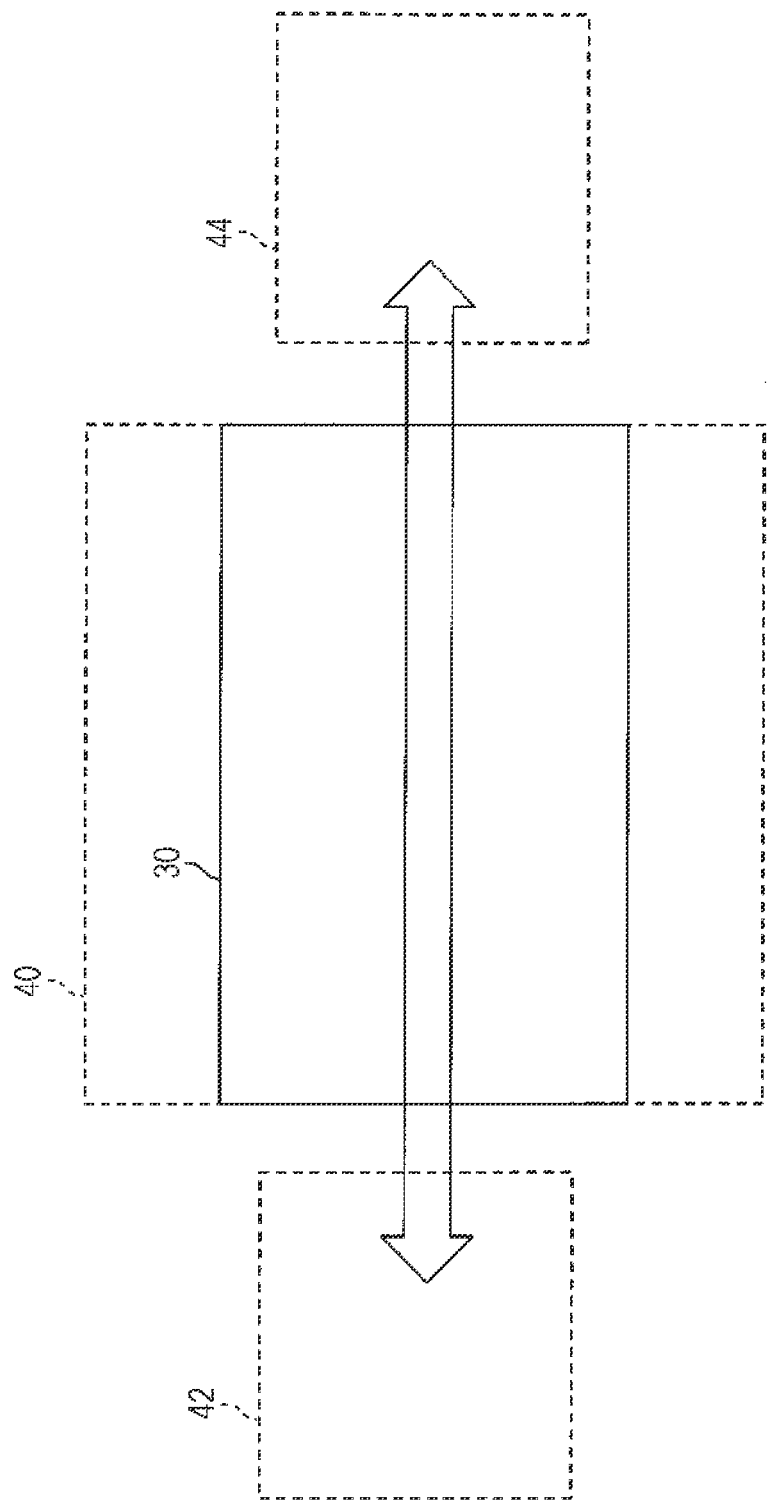
FIG. 3 is a schematic diagram illustrating a configuration of multiple pages.

A layout of multiple pages will be described. Examples of a layout of multiple pages include a layout in the horizontal direction and a layout in the vertical direction, on the basis of the display area. FIG. 3 illustrates an exemplary layout in the horizontal direction. In the example illustrated in FIG. 3, the display page image 40 which is an image to be displayed is enlarged and displayed in the display area 30. A previous page image 42 is present as the previous page of the display page image 40. A next page image 44 is present as the next page of the display page image 40. In the display area 30, a part of the display page image 40 is displayed. For example, the previous page image 42 is laid out on the left side of the display page image 40, and the next page image 44 is laid out on the right side of the display page image 40. Thus, when multiple pages are laid out in the horizontal direction, the controller 18 detects left-side or right-side contact in which an end portion of the display page image 40 is in contact with an end portion of the display area 30.

Figure 4:
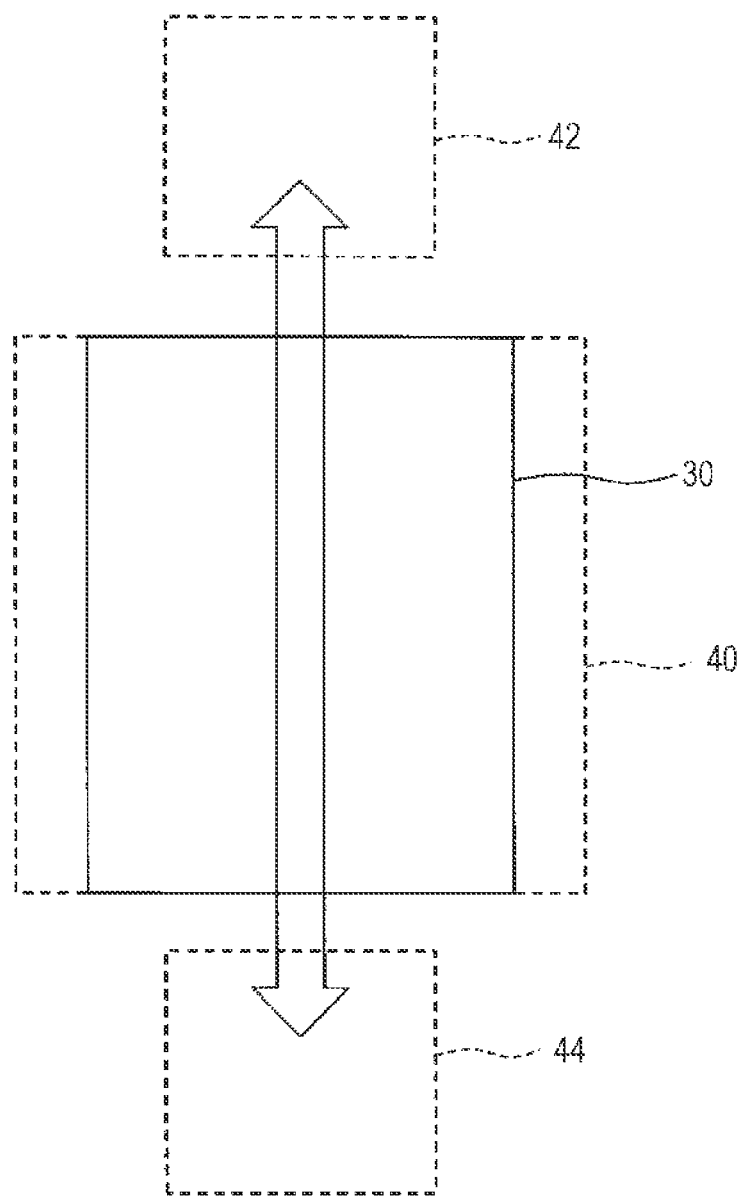
FIG. 4 is a schematic diagram illustrating a configuration of multiple pages.

FIG. 4 illustrates an exemplary layout in the vertical direction. In the example illustrated in FIG. 4, a previous page image 42 is laid out on the upper side of the display page image 40, and a next page image 44 is laid out on the lower side of the display page image 40. Thus, when multiple pages are laid out in the vertical direction, the controller 18 detects upper-side or lower-side contact in which an end portion of the display page image 40 is in contact with an end portion of the display area 30.

Figure 5:
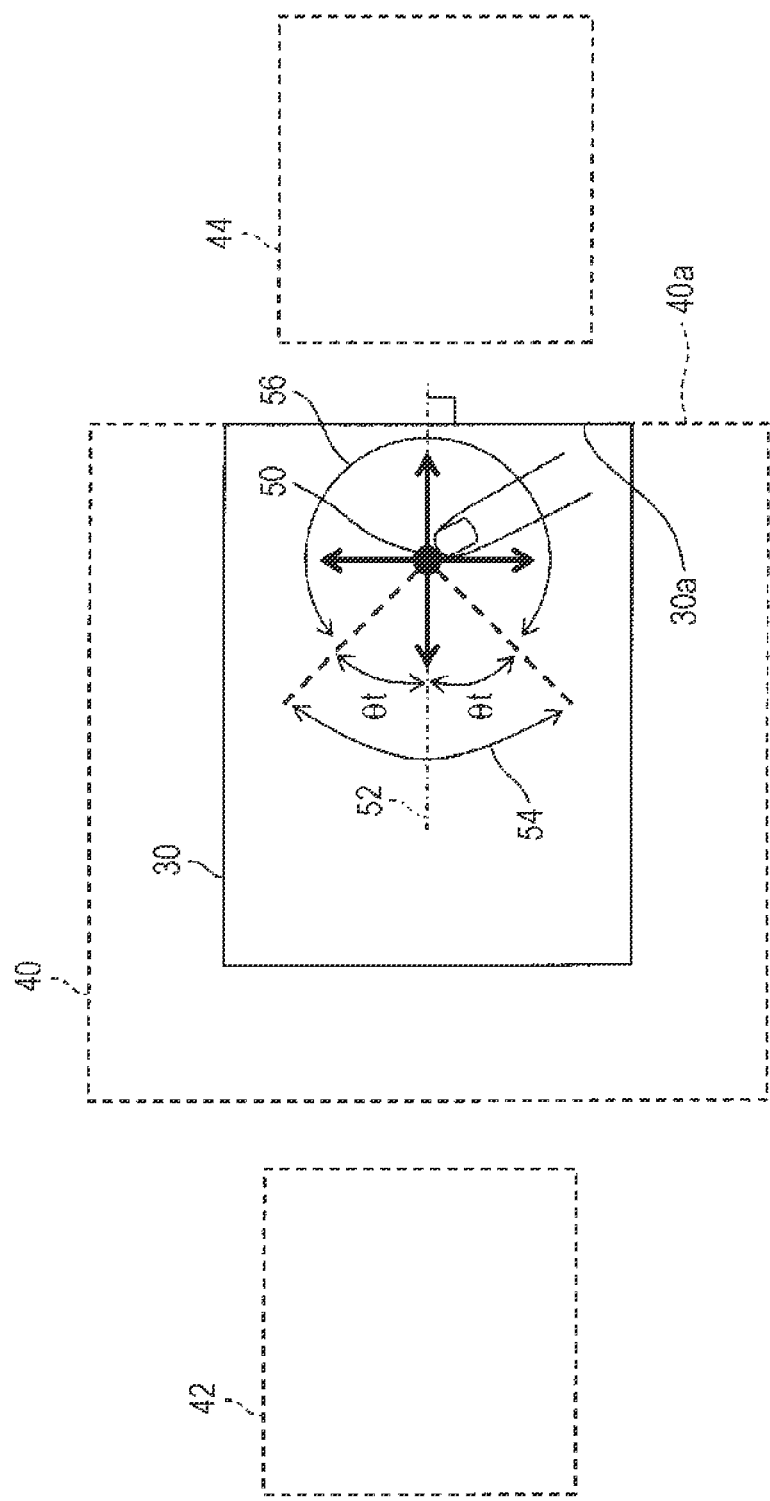
FIG. 5 is a schematic diagram for describing a process of determining an operation mode.

The control operation performed by the controller 18 will be described below with reference to FIG. 5 by taking image data in which pages are laid out in the horizontal direction, as an example. In the example illustrated in FIG. 5, an end portion (image end portion 40a) in the direction in which the next page image 44 is laid out, among the end portions of the display page image 40 is in contact with the right end portion (display-area end portion 30a) of the display area 30. In this state, in the case where the angle of the drag direction with respect to the direction orthogonal to the display-area end portion 30a (virtual line 52 orthogonal to the display-area end portion 30a) is equal to or less than a predetermined threshold angle θt and where the drag direction goes away from the display-area end portion 30a, the controller 18 selects the page switching mode. Otherwise, the controller 18 selects the scroll mode. In the example illustrated in FIG. 5, in the case where a touch position 50 serves as a start point and where the drag direction is in a page-switching-mode range 54 (range equal to or smaller than 2θt), the controller 18 selects the page switching mode. In contrast, in the case where the drag direction is in a scroll-mode range 56 (range other than the range of 2θt), the controller 18 selects the scroll mode. In a state in which the right end portion (image end portion 40a) of the display page image 40 is in contact with the right end portion (display-area end portion 30a) of the display area 30, even when a scroll operation is performed from the right side to the left side, the display position of the display page image 40 is not moved from the right side to the left side. Accordingly, when the drag direction is in the page-switching-mode range 54 (when the dragging operation is performed to the left side), the controller 18 selects the page switching mode, not the scroll mode. The threshold angle θt is, for example, 45°. Therefore, the page-switching-mode range 54 is a range of −45° to +45° (90°). Alternatively, another value may be used as the threshold angle θt, or a user may set the threshold angle θt.

In the determination of the angle of a drag direction, an error occurs if a certain degree of drag distance (drag amount) is not obtained. Therefore, the controller 18 may determine an operation mode when the drag distance is equal to or more than a predetermined distance threshold Lt.

Figure 6:
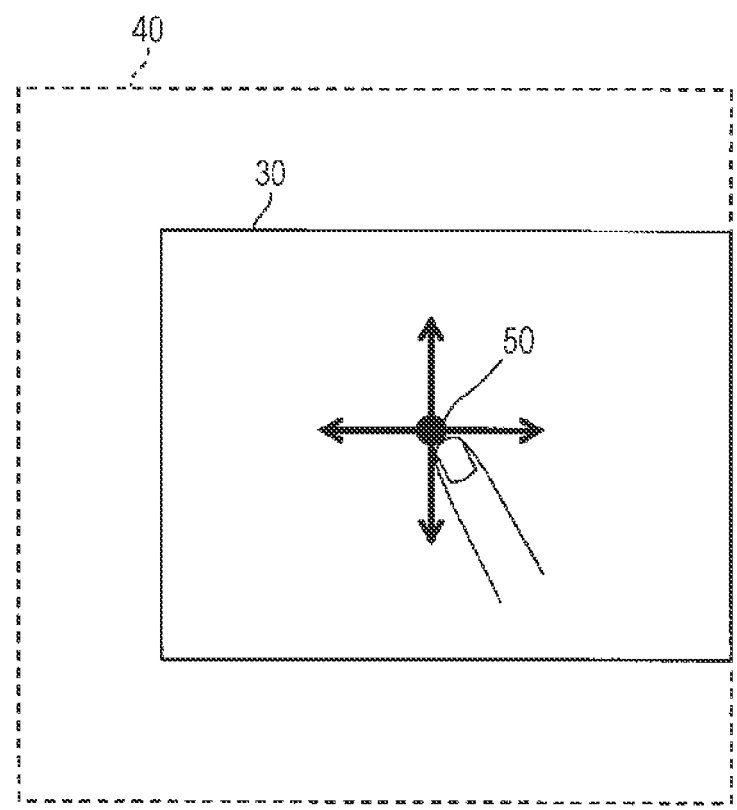
FIG. 6 is a schematic diagram for describing a scroll mode.
Figure 7:
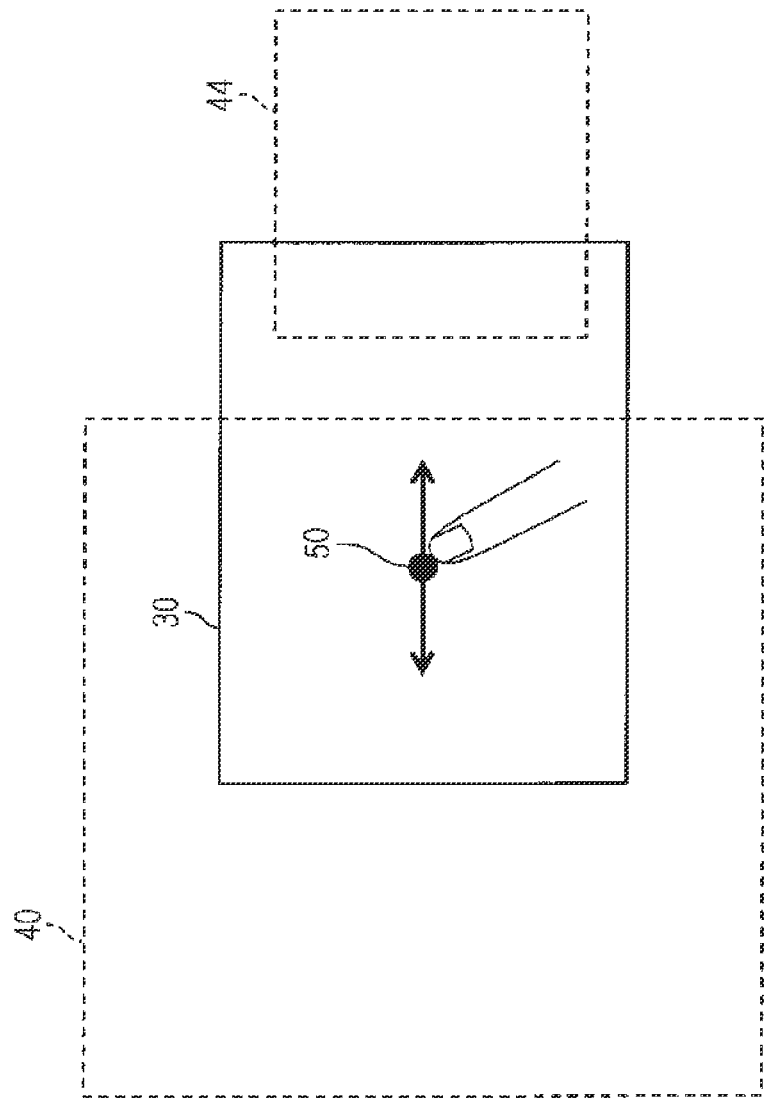
FIG. 7 is a schematic diagram for describing a page switching mode.

When the scroll mode is selected according to the above-described process, as illustrated in FIG. 6, the controller 18 moves the display position of the display page image 40 which is enlarged and displayed in the display area 30, in accordance with the drag direction and the drag distance. In contrast, when the page switching mode is selected, as illustrated in FIG. 7, the controller 18 scrolls the page in accordance with the drag distance, and displays the next page image 44 in the display area 30. When the page is thus scrolled, the next page image 44 in a range according to the drag distance is gradually drawn so as to be displayed in the display area 30. In the examples illustrated in FIGS. 5 and 7, when a dragging operation to the left side is performed, the controller 18 gradually displays the next page image 44 in the display area 30 in accordance with the drag distance. When the display page image 40 displayed in the display area 30 is an image in the last page, the controller 18 does not scroll the page.

Figure 8:
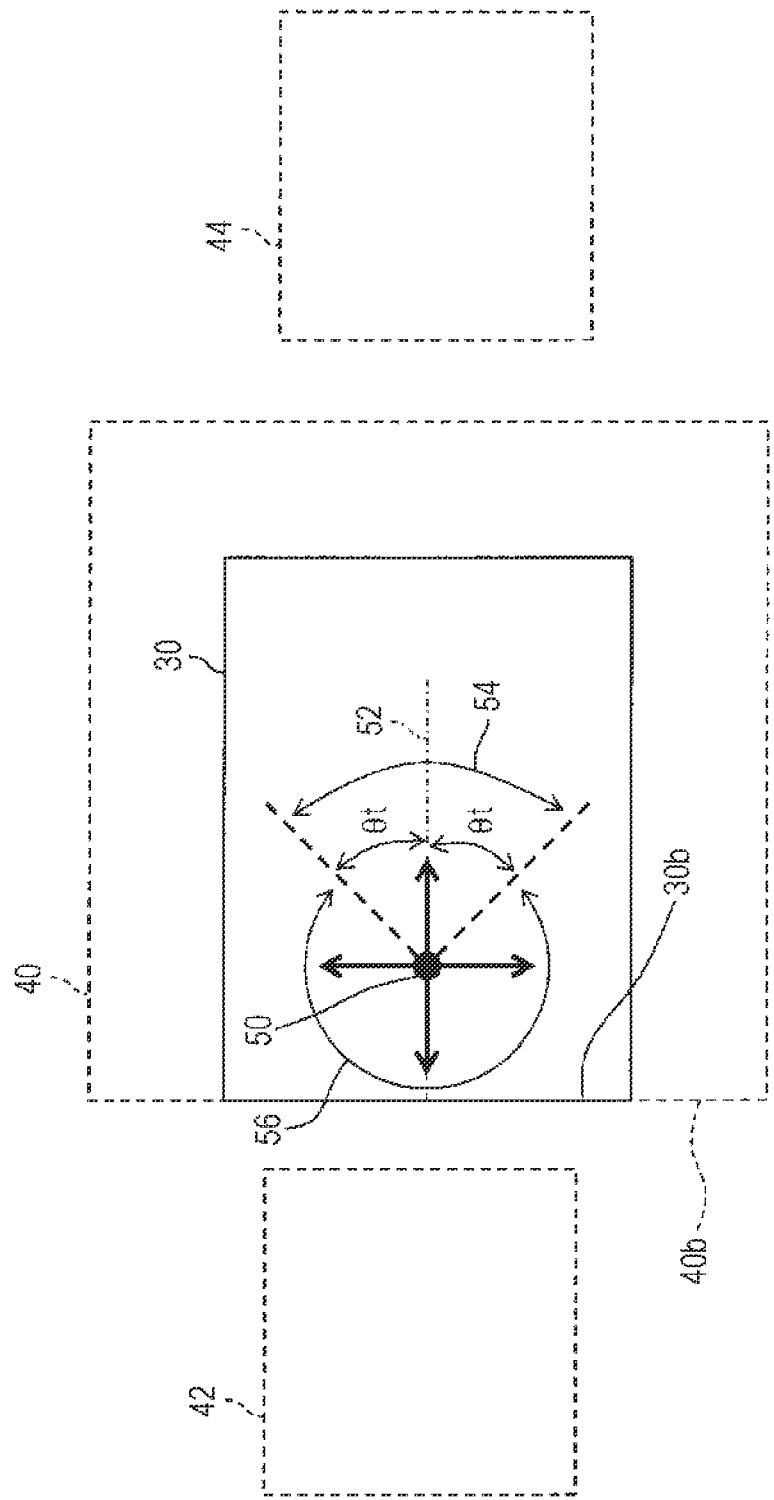
FIG. 8 is a schematic diagram for describing a process of determining an operation mode.

As illustrated in FIG. 8, in the case where an end portion (image end portion 40b) in the direction in which the previous page image 42 is laid out, among the end portions of the display page image 40 is in contact with the left end portion (display-area end portion 30b) of the display area 30, where the angle of the drag direction with respect to the direction orthogonal to the display-area end portion 30b (virtual line 52) is equal to or less than the predetermined threshold angle θt, and where the drag direction goes away from the display-area end portion 30b, the controller 18 selects the page switching mode. Otherwise, the controller 18 selects the scroll mode. When the page switching mode is selected, the controller 18 scrolls the page in accordance with the drag distance, and displays the previous page image 42 in the display area 30. In the example illustrated in FIG. 8, when a dragging operation to the right side is performed, the controller 18 gradually displays the previous page image 42 in the display area 30 in accordance with the drag distance. In a state in which the left end portion (image end portion 40b) of the display page image 40 is in contact with the left end portion (display-area end portion 30b) of the display area 30, even when a scroll operation is performed from the left side to the right side, the display position of the display page image 40 is not moved from the left side to the right side. Accordingly, when the drag direction is in the page-switching-mode range 54 (when a dragging operation is performed to the right side), the controller 18 select the page switching mode, not the scroll mode. When the display page image 40 displayed in the display area 30 is an image in the first page, the controller 18 does not scroll the page.

As described above, in a state in which the end portion in the direction in which a page to be switched is laid out, among the end portions of the display page image 40 is in contact with an end portion of the display area 30, when a dragging operation is performed so as to select the page switching mode, the controller 18 displays an image in the page to be switched in the display area 30. For example, when a user wants to switch the page, the user may perform a scroll operation so that an end portion of the display area 30 in the direction in which the page to be switched is laid out is in contact with an end portion of the display page image 40, and may perform a dragging operation in this state so that the page switching mode is selected. For example, when a user wants to switch the page to the next page image 44, the user may perform a scroll operation so that the right end portion (image end portion 40a) of the display page image 40 is in contact with the right end portion (display-area end portion 30a) of the display area 30 as illustrated in FIG. 5, and may perform a dragging operation in this state so that the page switching mode is selected. Similarly, when a user wants to switch the page to the previous page image 42, the user may perform a scroll operation so that the left end portion (image end portion 40b) of the display page image 40 is in contact with the left end portion (display-area end portion 30b) of the display area 30 as illustrated in FIG. 8, and may perform a dragging operation in this state so that the page switching mode is selected.

Figure 9:
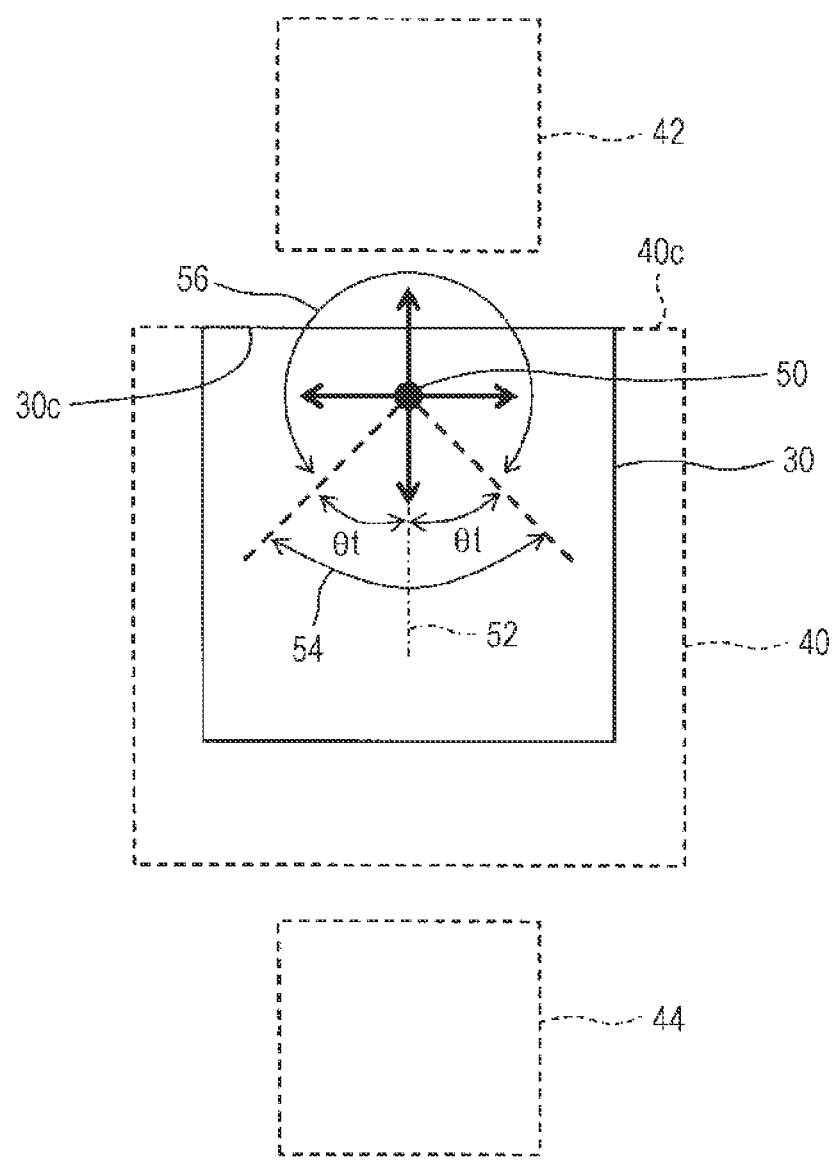
FIG. 9 is a schematic diagram for describing a process of determining an operation mode.

As another example, as illustrated in FIG. 9, when an image of another page is laid out in the vertical direction of the display page image 40, similarly to the case in which an image of another page is laid out in the horizontal direction, the page switching mode and the scroll mode are switched to each other. For example, assume that the previous page image 42 is laid out in the upper side of the display page image 40 and that the next page image 44 is laid out in the lower side of the display page image 40. At that time, in a state in which the top end portion (image end portion 40c) of the display page image 40 is in contact with the top end portion (display-area end portion 30c) of the display area 30, in the case where the angle of the drag direction with respect to the direction orthogonal to the display-area end portion 30c (from the virtual line 52) is equal to or less than the threshold angle θt and where the drag direction goes away from the display-area end portion 30c, the controller 18 selects the page switching mode. Otherwise, the controller 18 selects the scroll mode. In the example illustrated in FIG. 9, when a dragging operation is performed to the lower side, the controller 18 displays the previous page image 42 in the display area 30. In a state in which the top end portion (image end portion 40c) of the display page image 40 is in contact with the top end portion (display-area end portion 30c) of the display area 30, even when a scroll operation is performed from the upper side to the lower side, the display position of the display page image 40 is not moved from the upper side to the lower side. Accordingly, when the drag direction is in the page-switching-mode range 54 (when a dragging operation is performed to the lower side), the controller 18 selects the page switching mode, not the scroll mode. In a state in which the bottom end portion of the display page image 40 is in contact with the bottom end portion of the display area 30, in the case where the angle of the drag direction with respect to the direction orthogonal to the bottom end portion of the display area 30 is equal to or less than the threshold angle θt and where the drag direction goes away from the bottom end portion of the display area 30, the controller 18 selects the page switching mode and displays the next page image 44 in the display area 30.

Operations performed by the image display apparatus 10 will be described with reference to the flowchart illustrated in FIG. 10. For example, as illustrated in FIG. 5, pages are laid out in the horizontal direction, and the display page image 40 is enlarged and displayed in the display area 30. When a user operates the touch panel 12, the controller 18 detects the user operation on the basis of the detection result from the touch panel 12 (in step S01) and performs a control operation in accordance with the operation (in step S02).

If the detected operation is a "touch operation", the controller 18 sets the operation mode to an initial state, i.e., a state having no operation modes (in step S03). Then, the process returns back to step S01.

If the detected operation corresponds to a "dragging operation", the controller 18 performs a control operation according to the operation mode (in step S04). If the scroll mode is already specified as the operation mode (in step S04: scrolling), the controller 18 moves the display position of the display page image 40 illustrated in FIG. 5 in accordance with the drag direction and the drag distance (in step S07). Then, the process returns back to step S01. In contrast, if the page switching mode is already specified as the operation mode (in step S04: page switching), the controller 18 scrolls the page in accordance with the drag distance, and displays an image in another page in the display area 30 (in step S10). Then, the process returns back to step S01.

If either of the scroll mode and the page switching mode is not specified (in step S04: not specified), the controller 18 determines the operation mode on the basis of whether or not an end portion of the display page image 40 is in contact with an end portion of the display area 30 (in step S05). For example, if an end portion of the display page image 40 is not in contact with an end portion of the display area 30 (in step S05, NO), the controller 18 sets the scroll mode to the operation mode (in step S06). In this case, the controller 18 moves the display position of the display page image 40 in accordance with the drag direction and the drag distance (in step S07). Then, the process returns back to step S01.

Figure 11A:
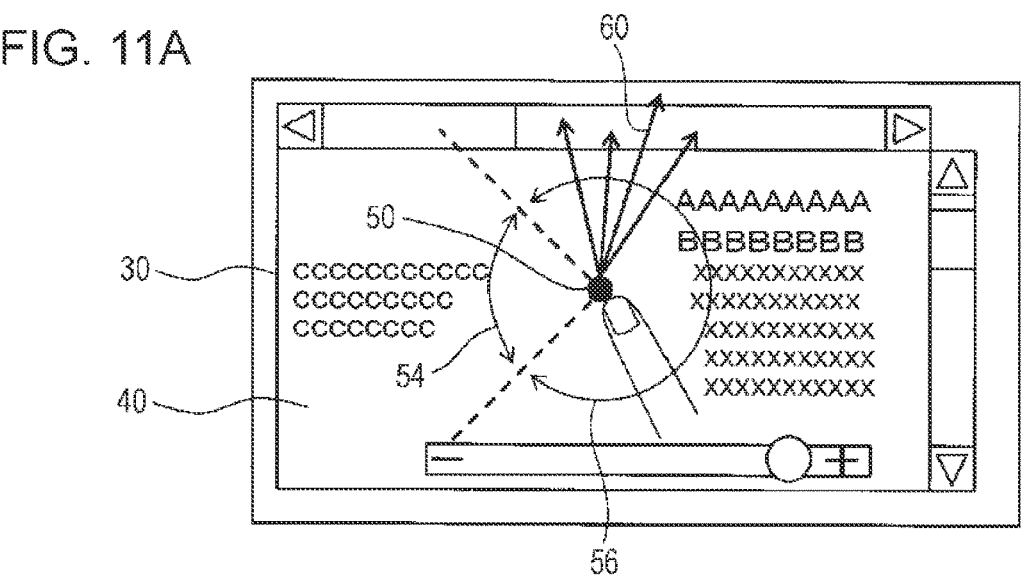
FIGS. 11A and 11B are schematic diagrams for describing a scroll mode.
Figure 11B:
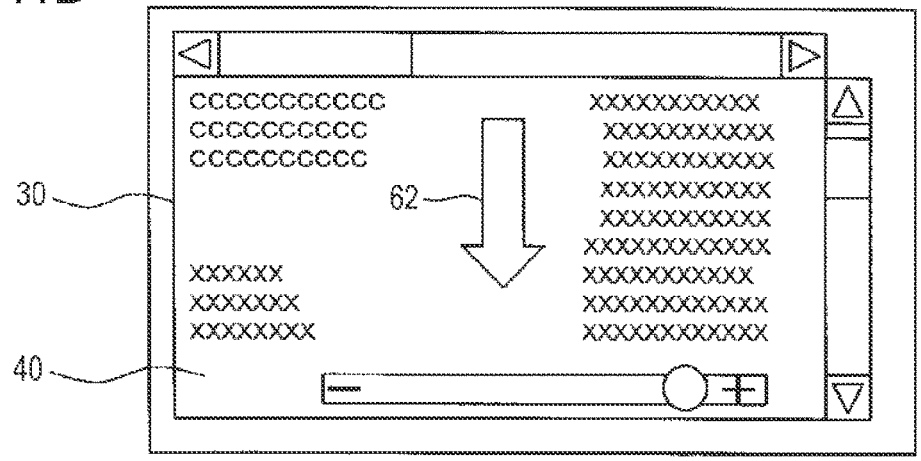

If an end portion of the display page image 40 is in contact with an end portion of the display area 30 (in step S05, YES), the controller 18 determines the operation mode in accordance with the angle of the drag direction (in step S08). For example, as illustrated in FIG. 11A, in the case where the angle of the drag direction illustrated by using an arrow 60 is larger than the threshold angle θt and is in the scroll-mode range 56 (range other than the range of 2θt), the controller 18 sets the scroll mode to the operation mode (in step S06). In this case, for example, as illustrated in FIG. 11B, the controller 18 moves the display position of the display page image 40 in accordance with the drag direction and the drag distance (in step S07). For example, as illustrated in FIG. 11A, when a dragging operation is performed in the upper direction illustrated by using the arrow 60, the controller 18 moves the display position of the display page image 40 in the lower direction illustrated by using an arrow 62 (performs scrolling in the down direction) as illustrated in FIG. 11B. Then, the process returns back to step S01.

Figure 12A:
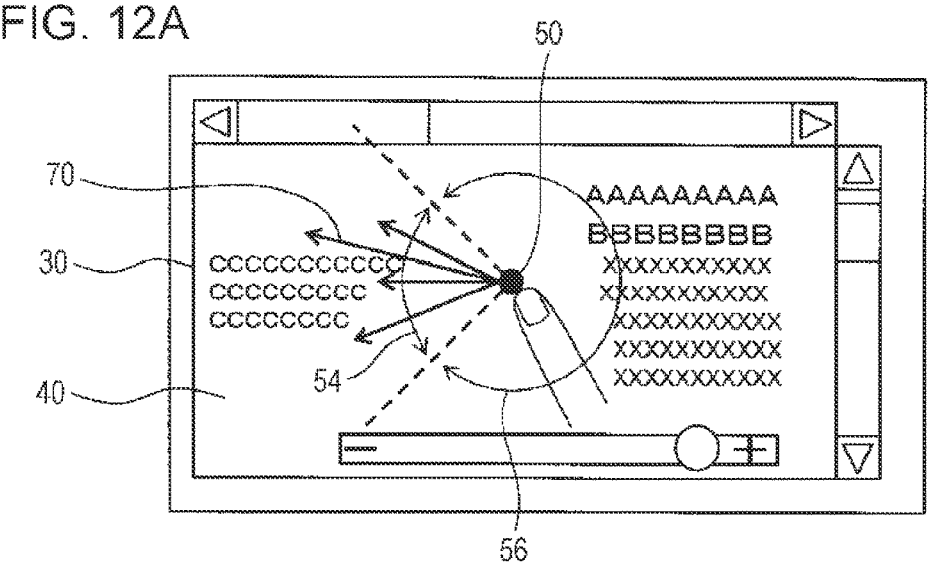
FIGS. 12A and 12B are schematic diagrams for describing a page switching mode.
Figure 12B:
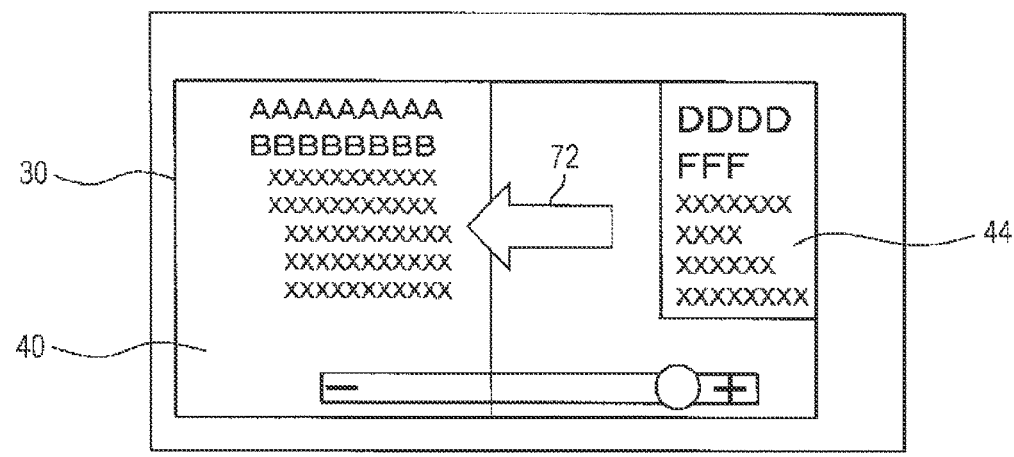

In contrast, for example, as illustrated in FIG. 12A, in the case where the angle of the drag direction illustrated by using an arrow 70 is equal to or less than the threshold angle θt and is in the page-switching-mode range 54 (range equal to or less than 2θt), the controller 18 sets the page switching mode to the operation mode (in step S09). In this case, for example, as illustrated in FIG. 12B, the controller 18 scrolls the page in accordance with the drag distance, and displays an image of another page (for example, the next page image 44) in the display area 30 (in step S10). For example, as illustrated in FIG. 12A, if a dragging operation is performed in the left direction illustrated by using the arrow 70, the controller 18 scrolls the page in the left direction illustrated by using an arrow 72 as illustrated in FIG. 12B, and displays the next page image 44 in the display area 30. For example, the controller 18 scrolls the page, and thereby displays the next page image 44 gradually in the display area 30. Then, the process returns back to step S01.

In step S02, if a "releasing operation" is detected, the controller 18 performs a control operation according to the operation mode (in step S11). If the page switching mode is specified as the operation mode (in step S11: page switching), the controller 18 switches the page on the basis of the dragging operation just before the release (in step S12). If the page is being scrolled, the controller 18 stops scrolling the page, and switches the page. If the page switching caused by the page scrolling is being performed, the controller 18 compares the size of the displayed part of the display page image 40 which is being displayed in the display area 30 in the page switching with the size of the displayed part of an image of another page (previous page image 42 or the next page image 44) which is being displayed in the display area 30 by drawing the image through the page scrolling. If the size of the displayed part of the display page image 40 is larger than the size of the displayed part of the image of another page, the controller 18 may display the display page image 40 back in the display area 30. If the size of the displayed part of the image of another page is larger than the size of the displayed part of the display page image 40, the controller 18 may switch the page and display the image of another page in the display area 30. The controller 18 may determine whether or not the operation is a flick operation on the basis of the speed or the distance of the dragging operation when a releasing operation is performed. If a flick operation is detected, the controller 18 may switch the page regardless of the state of the page scrolling.

In contrast, in step S11, if an operation mode is not specified or if the scroll mode is specified (in step S11: not specified or scrolling), the controller 18 ends the process. For example, if the scroll mode is specified, the controller 18 stops scrolling. If a flick operation is detected in the scroll mode, the controller 18 may continue scrolling in the direction in which the flicking is performed, and may gradually stop scrolling with lapse of time.

The above-described image display apparatus 10 determines an operation mode from the page switching mode and the scroll mode, on the basis of the drag direction in a state in which an end portion of the display page image 40 is in contact with an end portion of the display area 30. Accordingly, page switching or scrolling which is performed against a user's intention is prevented or suppressed, and the operability of a touch panel is improved. In the present exemplary embodiment, the end portion of the display area 30 in the direction in which a page to be switched is laid out is made in contact with an end portion of the display page image 40, and a dragging operation is performed in this state, whereby an operation mode is selected from the page switching mode and the scroll mode, achieving a simple operation of selecting an operation mode intended by a user.

The operation mode is determined on the basis of the page-switching-mode range 54 (range equal to or less than 2θt). Therefore, even when a user performs a dragging operation without a clear intention, an operation against a user's intention is prevented or suppressed. An influence on the performance of detection of coordinates which is caused by a touch panel is reduced, causing an operation against a user's intention to be prevented or suppressed.

A first modified embodiment will be described with reference to FIG. 13. In the first modified embodiment, images 90 and 92 of other pages are laid out in the horizontal direction of the display page image 40, and images 94 and 96 of other pages are laid out in the vertical direction. In a state in which either one of the left and right end portions of the display page image 40 is in contact with a corresponding one of the left and right end portions of the display area 30, when a dragging operation is performed, the controller 18 selects an operation mode from the page switching mode and the scroll mode for the horizontal direction. In contrast, in a state in which either one of the top and bottom end portions of the display page image 40 is in contact with a corresponding one of the top and bottom end portions of the display area 30, when a dragging operation is performed, the controller 18 selects an operation mode from the page switching mode and the scroll mode for the vertical direction. Thus, even when pages are laid out in the horizontal direction and the vertical direction, similarly to the case in which pages are laid out in the horizontal direction or the vertical direction, the operability of a touch panel is improved.

The above-described threshold angle θt may be changed by a user. Thus, a condition corresponding to a user is set. The threshold angle θt may be set so that the threshold angle used when a page is laid out in the horizontal direction is different from that used when a page is laid out in the vertical direction. Accordingly, a condition corresponding to the installation condition or the like of the touch panel 12 may be set. The threshold angle θt which is set on the left side in the display area 30 may be different from that which is set on the right side. Similarly, the threshold angle θt which is set on the upper side in the display area 30 may be different from that which is set on the lower side.

Figure 14:
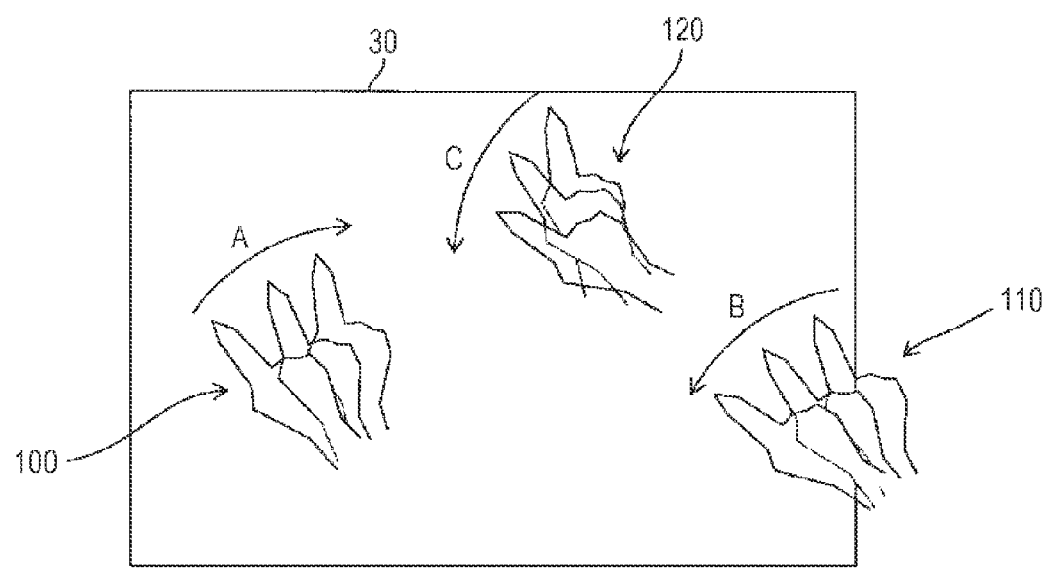
FIG. 14 is a schematic diagram for describing paths of dragging operations.

A second modified embodiment will be described with reference to FIGS. 14 to 18. FIG. 14 illustrates paths of movement using user's fingers 100, 110, and 120. For example, when a user performs a dragging operation, as illustrated by using arrows A, B, and C, the path of a dragging operation has a shape of arc. In particular, when a user operates the touch panel 12 which is standing, the user is likely to fix his/her wrist during a dragging operation. Therefore, the path of the dragging operation has a shape of arc. In the second modified embodiment, the threshold angle is set depending on the path of a dragging operation. In the second modified embodiment described below, a user performs a dragging operation with a finger of his/her right hand.

Figure 15:
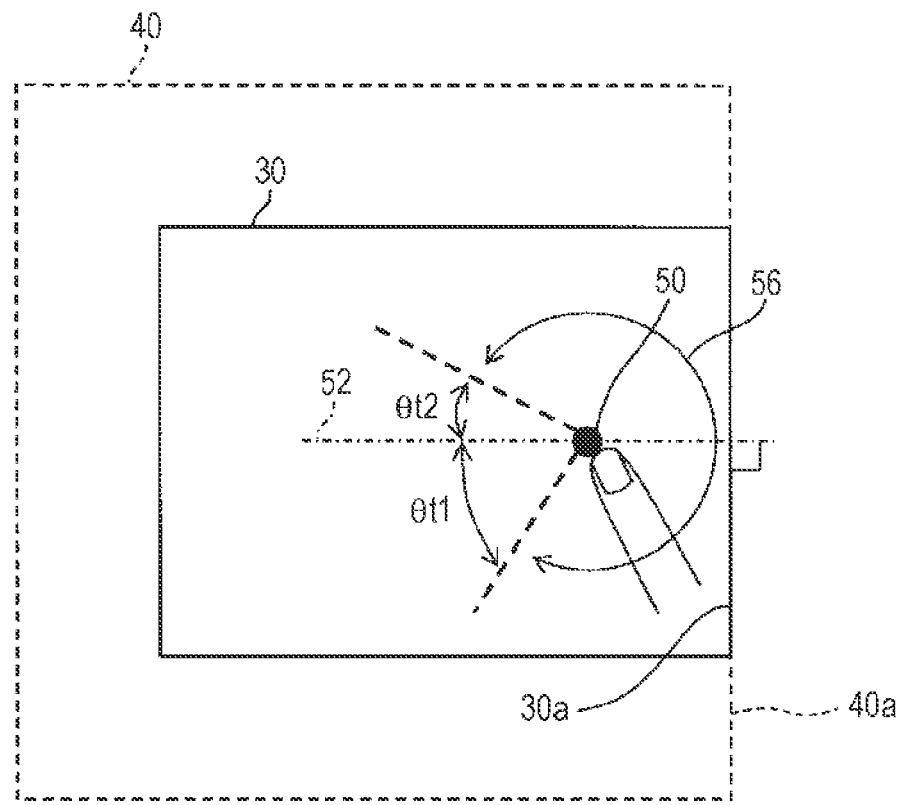
FIG. 15 is a schematic diagram for describing a process according to a second modified embodiment.

For example, as illustrated in FIG. 15, when the right end portion (image end portion 40a) of the display page image 40 is in contact with the right end portion (display-area end portion 30a) of the display area 30, a user tries to draw an image of the page laid out on the right side of the display area 30 and display it. In this case, a path drawn with a user's finger is likely to go downward. Therefore, a threshold angle θt1 on the lower side of the virtual line 52 is set larger than a threshold angle θt2 on the upper side of the virtual line 52 (θt1>θt2). Accordingly, in the case where a user performs a dragging operation in order to draw an image on the right side, even when the path of the dragging operation goes downward, the angle of the drag direction is likely to be equal to or less than the threshold angle θt1, causing page switching to be performed according to the user's intention.

Figure 16:
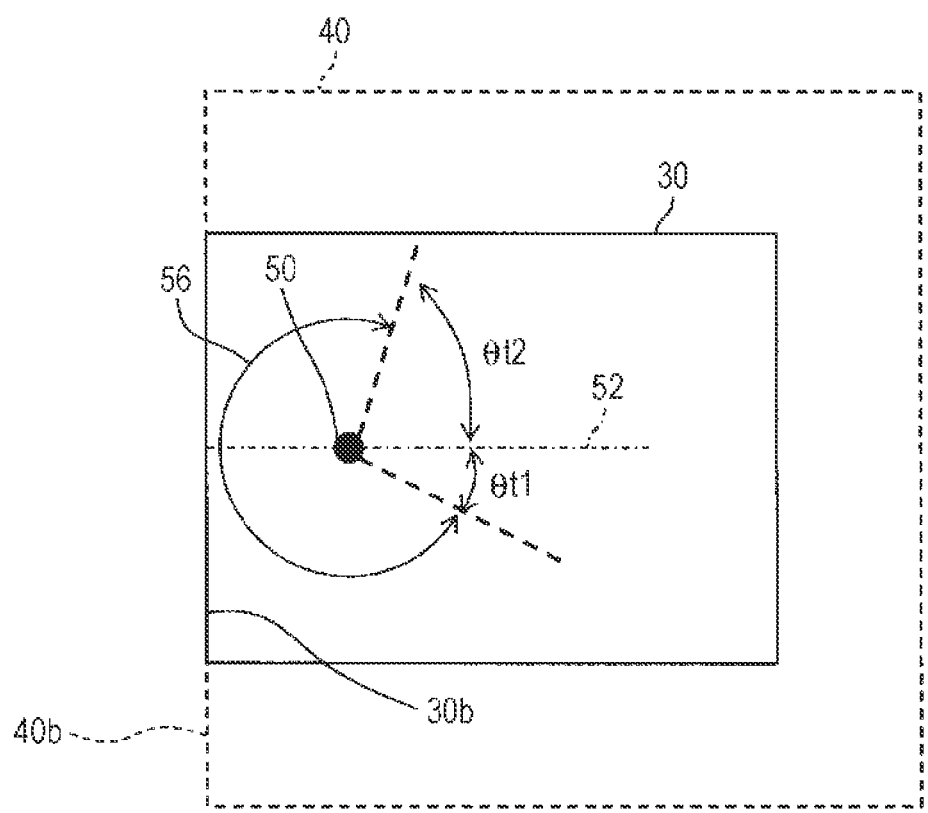
FIG. 16 is a schematic diagram for describing a process according to the second modified embodiment.

As illustrated in FIG. 16, when the left end portion (image end portion 40b) of the display page image 40 is in contact with the left end portion (display-area end portion 30b) of the display area 30, a user tries to draw an image of the page laid out on the left side of the display area 30 and display it. In this case, a path drawn with a user's finger is likely to go upward. Therefore, the threshold angle θt2 on the upper side of the virtual line 52 is set larger than the threshold angle θt1 on the lower side of the virtual line 52 (θt2>θt1). Accordingly, in the case where a user performs a dragging operation in order to draw an image on the left side, even when the path of the dragging operation goes upward, the angle of the drag direction is likely to be equal to or less than the threshold angle θt2, causing page switching to be performed according to the user's intention.

Figure 17:
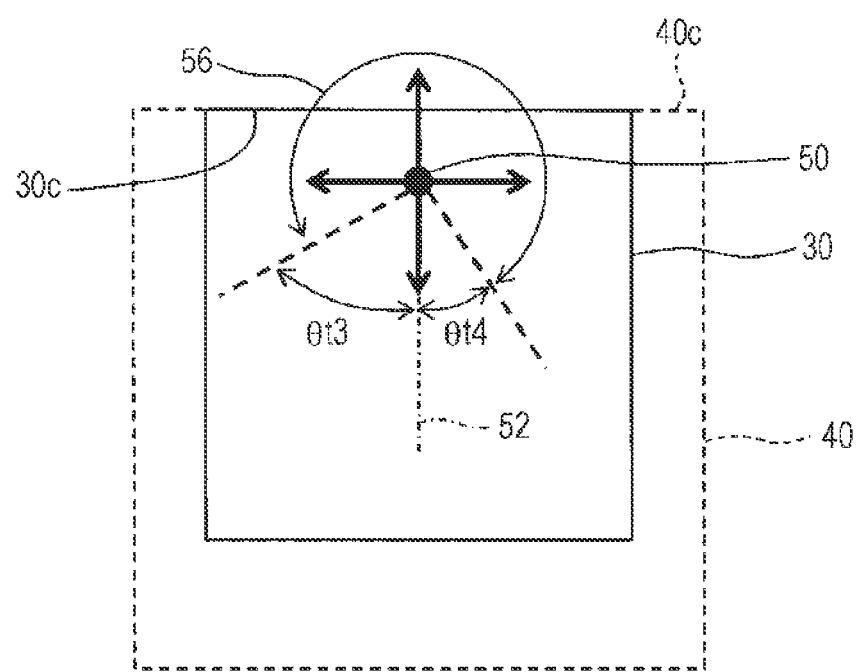
FIG. 17 is a schematic diagram for describing a process according to the second modified embodiment.

As illustrated in FIG. 17, when the top end portion (image end portion 40c) of the display page image 40 is in contact with the top end portion (display-area end portion 30c) of the display area 30, a user tries to draw an image of the page laid out on the upper side of the display area 30 and display it. In this case, a path drawn with a user's finger is likely to go leftward. Therefore, a threshold angle θt3 on the left side of the virtual line 52 is set larger than a threshold angle θt4 on the right side of the virtual line 52 (θt3>θt4). Accordingly, in the case where a user performs a dragging operation in order to draw an image on the upper side, even when the path of the dragging operation goes leftward, the angle of the drag direction is likely to be equal to or less than the threshold angle θt3, causing page switching to be performed according to the user's intention.

Figure 18:
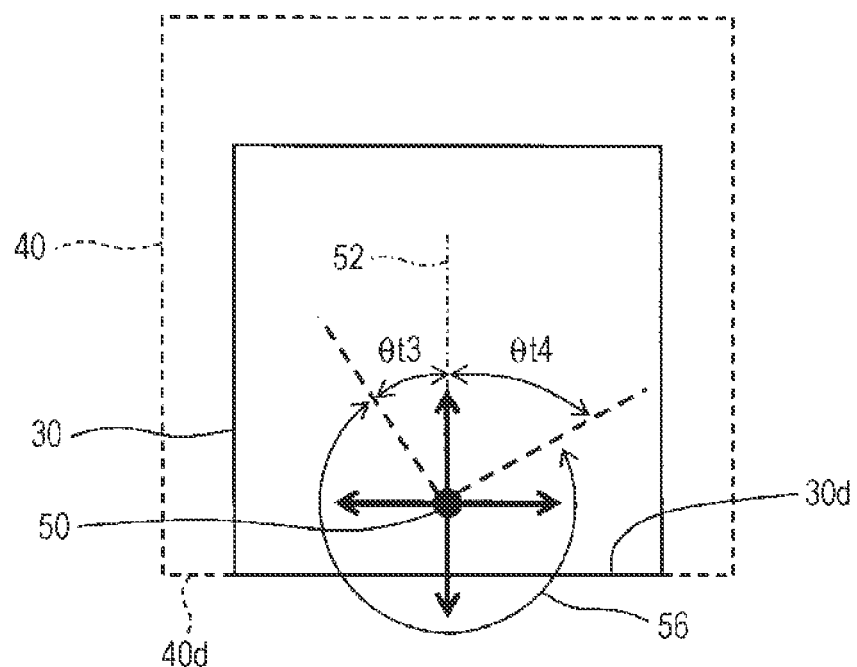
FIG. 18 is a schematic diagram for describing a process according to the second modified embodiment.

As illustrated in FIG. 18, when the bottom end portion (image end portion 40d) of the display page image 40 is in contact with the bottom end portion (display-area end portion 30d) of the display area 30, a user tries to draw an image of the page laid out on the lower side of the display area 30 and display it. In this case, a path drawn with a user's finger is likely to go rightward. Therefore, a threshold angle θt4 on the right side of the virtual line 52 is set larger than a threshold angle θt3 on the left side of the virtual line 52 (θt4>θt3). Accordingly, in the case where a user performs a dragging operation in order to draw an image on the lower side, even when the path of the dragging operation goes rightward, the angle of the drag direction is likely to be equal to or less than the threshold angle θt4, causing page switching to be performed according to the user's intention.

The relationship of the threshold angle in the above-described second modified embodiment is as follows.

When an image on the right side is to be drawn, the threshold angle θt1 on the lower side>the threshold angle θt2 on the upper side.

When an image on the left side is to be drawn, the threshold angle θt2 on the upper side>the threshold angle θt1 on the lower side.

When an image on the upper side is to be drawn, the threshold angle θt3 on the left side>the threshold angle θt4 on the right side.

When an image on the lower side is to be drawn, the threshold angle θt4 on the right side>the threshold angle θt3 on the left side.

When a user performs a dragging operation with a finger of his/her left hand, the above-described inequality signs are to be reversed. For example, information about which hand is to be used in a dragging operation may be set in the image display apparatus 10. For example, the setting is performed by a user. When the setting is such that a dragging operation is to be performed with a right hand, the controller 18 performs a process by using the above-described inequality signs. When the setting is such that a dragging operation is to be performed with a left hand, the controller 18 performs a process by using less-than signs obtained by reversing the above-described inequality signs.

As described above, instead of using the same threshold angle on the upper side and the lower side or on the left side and the right side of the virtual line 52, the threshold angles on the upper side and the lower side or on the left side and the right side are changed depending on the direction in which page switching is performed, whereby page switching is easily performed according to the user's intension, preventing or reducing a decrease in the usability.

When the touch panel 12 being inclined is installed, the path of a drag direction is likely to go downward. Accordingly, the inequality, i.e., the threshold angle θt1 on the lower side>the threshold angle θt2 on the upper side, may be used.

In the above-described exemplary embodiment and the first and second modified embodiments, the case in which a touch panel is used is described. The apparatus which receives a user operation is not limited to a touch panel, and may be a mouse. Even when a mouse is used, the controller 18 performs a process for the page switching mode or the scroll mode on the basis of the direction in which the position specified with a mouse is moved.

In the above-described exemplary embodiment and the first and second modified embodiments, the example in which image data constituted by multiple pages is displayed is described. The present exemplary embodiment is not limited to this example. For example, when an application for viewing photographs or the like is performed, the present exemplary embodiment may be applied. In this case, the controller 18 may perform a process for the photograph switching mode (page switching mode) in which a photograph displayed on the display unit 14 is switched one after another among photographs (images) or a process for the scroll mode in which the display position of a photograph being displayed on the display unit 14 is moved.

The above-described image display apparatus 10 is achieved, for example, through cooperation of hardware resources and software. Specifically, the image display apparatus 10 includes a processor (not illustrated) such as a central processing unit (CPU). The processor reads out programs stored in a storage (not illustrated) and executes them, achieving the functions of the controller 18. The above-described programs are stored in the storage via a recording medium, such as a compact disc (CD) or a digital versatile disc (DVD), or via a communication unit such as a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display apparatus comprising:
   a detector configured to detect a specified position on a display screen on which an image is displayed; and
   a controller configured to, in response to the specified position on the display screen being moved, perform a page switching operation or a move operation on the basis of a movement direction in which the specified position is moved, the page switching operation being an operation of switching an image being displayed on the display screen to another image, the move operation being an operation of moving a display position of an entirety of the image being displayed on the display screen,
   wherein the controller is configured to perform the page switching operation if a condition is satisfied, and the controller is configured to perform the move operation if the condition is not satisfied, the condition being that an angle of the movement direction with respect to a direction orthogonal to an end portion of the display area which is in contact with an end portion of the image is equal to or less than one of a plurality of predetermined threshold angles, being asymmetrically disposed about the direction orthogonal to the end portion of the display area, and the movement direction goes away from the end portion of the display area which is in contact with the end portion of the image.

2. The image display apparatus according to claim 1,
   wherein, in response to the end portion of the image being displayed on the display screen being in contact with the end portion of a display area of the display screen, the controller is configured to perform the page switching operation or the move operation on the basis of the movement direction in which the specified position is moved.

3. A non-transitory computer readable medium storing a program causing a computer to execute a process for displaying an image, the process comprising:
   detecting a specified position on a display screen on which an image is displayed; and
   in response to the specified position on the display screen being moved, performing a page switching operation or a move operation on the basis of a movement direction in which the specified position is moved, the page switching operation being an operation of switching an image being displayed on the display screen to another image, the move operation being an operation of moving a display position of an entirety of the image being displayed on the display screen,
   wherein the controller is configured to perform the page switching operation if a condition is satisfied, and the controller is configured to perform the move operation if the condition is not satisfied, the condition being that an angle of the movement direction with respect to a direction orthogonal to an end portion of the display area which is in contact with an end portion of the image is equal to or less than one of a plurality of predetermined threshold angles, being asymmetrically disposed about the direction orthogonal to the end portion of the display area, and the movement direction goes away from the end portion of the display area which is in contact with the end portion of the image.

4. An image display method comprising:
   detecting a specified position on a display screen on which an image is displayed; and
   in response to the specified position on the display screen being moved, performing a page switching operation or a move operation on the basis of a movement direction in which the specified position is moved, the page switching operation being an operation of switching an image being displayed on the display screen to another image, the move operation being an operation of moving a display position of an entirety of the image being displayed on the display screen,
   wherein the controller is configured to perform the page switching operation if a condition is satisfied, and the controller is configured to perform the move operation if the condition is not satisfied, the condition being that an angle of the movement direction with respect to a direction orthogonal to an end portion of the display area which is in contact with an end portion of the image is equal to or less than one of a plurality of predetermined threshold angles, being asymmetrically disposed about the direction orthogonal to the end portion of the display area, and the movement direction goes away from the end portion of the display area which is in contact with the end portion of the image.

5. The image display apparatus according to claim 1,
   wherein, during the move operation and without changing the movement direction, the controller is configured to perform the page switching operation in response to the end portion of the image coming in contact with the end portion of the display area.

6. The process according to claim 3,
   wherein, during the move operation and without changing the movement direction, the controller is configured to perform the page switching operation in response to the end portion of the image coming in contact with the end portion of the display area.

7. The method according to claim 4,
   wherein, during the move operation and without changing the movement direction, the controller is configured to perform the page switching operation in response to the end portion of the image coming in contact with the end portion of the display area.

8. The image display apparatus according to claim 1, wherein
- the controller is further configured to perform a second page switching operation if a second condition is satisfied, the second condition being that a second angle of a second movement direction, in a direction opposite to the movement direction, with respect to the direction orthogonal to the end portion of the display area is equal to or less than one of a second plurality of predetermined angles, being asymmetrically disposed about the direction orthogonal to the end portion of the display area,
- the second plurality of angles opening towards a bottom end of the display area more so than the plurality of angles.

* * * * *